United States Patent [19]

Tamura et al.

[11] Patent Number: 5,495,762
[45] Date of Patent: Mar. 5, 1996

[54] PENDULUM ACCELERATION SENSOR

[75] Inventors: Kazuyuki Tamura; Hiroshi Iiyama, both of Saitama, Japan

[73] Assignee: Jeco Co., Ltd., Saitama, Japan

[21] Appl. No.: 221,881

[22] Filed: Apr. 1, 1994

[30] Foreign Application Priority Data

Apr. 27, 1993 [JP] Japan ............................ 5-027223 U

[51] Int. Cl.⁶ ................................................. G01P 3/44
[52] U.S. Cl. ................................ 73/519.01; 73/514.37
[58] Field of Search .......................... 73/517 R, 518, 73/519, 520, 526, 519.01, 514.37, 514.35, 514.36, 514.39, 522; 33/366, 391

[56] References Cited

U.S. PATENT DOCUMENTS

| | | | |
|---|---|---|---|
| 4,030,756 | 6/1977 | Eden | 303/24 A |
| 4,571,844 | 2/1986 | Komasaku et al. | 33/366 |
| 4,726,627 | 2/1988 | Frait et al. | 303/24 R |
| 5,177,370 | 1/1993 | Meister | 307/10.1 |
| 5,336,983 | 8/1994 | Watanabe | 318/651 |

*Primary Examiner*—Hezron E. Williams
*Assistant Examiner*—Richard A. Moller
*Attorney, Agent, or Firm*—Blakely, Sokoloff, Taylor & Zafman

[57] ABSTRACT

A pendulum acceleration sensor includes a plate-like pendulum, at least a pair of detection sensors, and a holder unit. The pendulum swings about a shaft in a direction parallel to the side surfaces of the pendulum in accordance with an acceleration. The pair of detection sensors are arranged to oppose each other with the pendulum interposed therebetween to detect the displacement amount of the pendulum upon swing. The holder unit is constituted by sensor storing members for storing the detection sensors and positioning the detection sensors with respect to the pendulum, and shaft support members integrally formed with the sensor storing members to pivotally support two ends of the shaft of the pendulum and define a swing space for the pendulum.

5 Claims, 6 Drawing Sheets

PENDULUM ACCELERATION SENSOR

BACKGROUND OF THE INVENTION

The present invention relates to a pendulum acceleration sensor for detecting an acceleration by measuring the swing amount of a pendulum and, more particularly, to an axial support structure for the pendulum.

A pendulum sensor, a leaf spring type sensor, and the like are available as a conventional vehicle acceleration sensor used for an anti-lock brake and a tilt angle sensor for detecting a tilt angle with respect to the direction of gravity. All these sensors are designed as follows. A displacement such as a swing of a pendulum or a bend of a leaf spring due to an acceleration or gravity is detected by an optical sensor, a magnetic sensor, or a capacitance sensor. The detected value is converted into an electrical signal. An acceleration or a tilt angle in an object to be measured, e.g., a vehicle, is then detected on the basis of this electrical signal. A damper mechanism is provided for such an acceleration or tilt angle sensor to prevent a pendulum, a leaf spring, or the like from resonating with external vibrations or to provide proper response characteristics.

As a damper mechanism, for example, a mechanism using a liquid such as a silicone oil or an anti-freeze is available. If a damper mechanism uses such a liquid, the cost of its hermetic structure is very high. In addition, as the viscosity of the liquid changes with a change in temperature, the damping characteristics change. That is, in a damper mechanism using a liquid, it is inevitable that the response characteristics change with a change in temperature. In order to eliminate such drawbacks of a damper mechanism using a liquid, a damper mechanism using magnetism has recently been employed. This magnetic damper mechanism is designed such that permanent magnets are arranged to oppose each other through a plate-like pendulum consisting of a nonmagnetic conductive material. In this structure, the pendulum is braked by an eddy current generated therein as it swings. Such a magnetic damper mechanism is not influenced by a change in temperature and hence has excellent temperature characteristics. A pendulum acceleration sensor having this conventional magnetic damper mechanism will be described below with reference to FIGS. 6 to 8C.

FIGS. 6 to 8A show the schematic arrangement of the conventional pendulum acceleration sensor. Referring to FIGS. 6 to 8A, the pendulum acceleration sensor denoted by reference numeral 10 as a whole is designed such that a pendulum 11 as a swing member swings about a support shaft 12. The pendulum 11 is made of a nonmagnetic conductive material to have a sectorial plate-like shape. A plurality of slits 11a and holes 11b are formed in the rim portion of the pendulum 11. Note that the support base, of the pendulum acceleration sensor 10, which swingably supports the pendulum 11, a detection means for detecting the displacement amount of the pendulum 11 and converting the amount into an electrical signal, and the like are omitted from FIGS. 6 and 7.

Reference numeral 13 denotes a magnetic damper, which comprises a pair of yokes 14, each having a U-shaped cross-section, and a pair of permanent magnets 15 respectively fixed to the yokes 14. The pair of yokes 14 and the pair of permanent magnets 15 are arranged to oppose each other through the pendulum 11. Each yoke 14 is fixed to a support base 16 such that magnetic pole portions 14a on two ends of the yoke face the pendulum 11. The permanent magnet 15 is mounted on the widthwise middle portion of the yoke 14. That is, a magnetic pole surface 14b on an end portion of each magnetic pole portion 14a opposes a side surface of the pendulum 11. Note that each permanent magnet 15 is magnetized in a direction parallel to the axial direction of the pendulum 11. Each yoke 14 is positioned such that the permanent magnet 15 is located immediately below the support shaft 12 of the pendulum 11 and opposes the rim portion of the pendulum 11.

Reference numeral 17 denotes a printed board, which has a rectangular window 17a formed therein and is positioned/mounted on the support base 16. Two pairs of holders 18 for storing two pairs of light-emitting and light-receiving elements as a detection means for detecting the displacement amount of the pendulum 11 and converting the amount into an electrical signal are mounted on the printed board 17 to sandwich the pendulum 11. A pair of opposing shaft support portions 16a defining a swing space for the pendulum 11 extend vertically upward from the support base 16 to extend through the window 17a. The support shaft 12 of the pendulum 11 is supported on the shaft support portions 16a such that the pendulum 11 is swingable in the swing space.

The operation of the conventional pendulum acceleration sensor having the above arrangement will be described next. When an acceleration is applied to the pendulum 11 or the support base 16 is tilted, the pendulum 11 swings about the support shaft 12. As the pendulum 11 swings, the optical paths extending from the light-emitting elements to the light-receiving elements through the slits 11a and the holes 11b are partly blocked. The displacement amount of the pendulum 11 is then obtained as changes in the amount of light received by the light-receiving elements, and is converted into an electrical signal. With this operation, an acceleration is detected. At this time, the pendulum 11 crosses magnetic fluxes generated between the opposing permanent magnets 15 and yokes 14. These magnetic fluxes are indicated by arrows Φ in FIG. 7. When the pendulum 11 crosses the magnetic fluxes in his manner, an eddy current is generated in the pendulum 11 consisting of a nonmagnetic conductive material, and the eddy current serves as an eddy current brake for braking the pendulum 11. As a result, the pendulum 11 is immediately stopped at the initial position. With this operation, an acceleration applied next can be detected without requiring a return time.

In the above-described conventional acceleration sensor, the shaft support portions 16a for supporting the pendulum 11 and the holders 18 for storing the light-emitting and light-receiving elements serving as the displacement amount detection means are separately formed. In this structure, owing to the accumulation of manufacturing and assembly errors, the positioning precision of the light-emitting and light-receiving elements with respect to the pendulum 11 deteriorates, resulting in a deterioration in detection precision. In addition, the yokes 14 arranged to sandwich the pendulum 11 are located outside the shaft support portions 16a and hence are respectively spaced apart from the plate surfaces of the pendulum 11 by distances corresponding to the thicknesses of the shaft support portions 16a. That is, in the conventional acceleration sensor, the pair of shaft support portions 16a are formed separately from the holders 18 and are integrally formed on the support base 16 to extend vertically upward and oppose each other. In this structure, since the thickness of each shaft support portion 16a can only be decreased to a certain limit in consideration of the strength, and the distance between each permanent magnet 15 and a corresponding plate surface of the pendulum 11 increases accordingly. For this reason, in order to obtain a predetermined magnetic flux density φ on each plate surface of the pendulum 11, one of large permanent magnets 15 are required. Therefore, the device itself increases in size, and the number of components increases, resulting in an increase in cost.

SUMMARY OF THE INVENTION

It is an object of the present invention to provide a pendulum acceleration sensor with improved detection precision.

It is another object of the present invention to provide a compact, inexpensive pendulum acceleration sensor.

In order to achieve the above objects, according to the present invention, there is provided a pendulum acceleration sensor comprising a plate-like pendulum which swings about a shaft in a direction parallel to side surfaces of the pendulum in accordance with an acceleration, at least a pair of detection sensors, arranged to oppose each other with the pendulum interposed therebetween, for detecting a displacement amount of the pendulum upon swing, and a holder unit constituted by sensor storing members for storing the detection sensors and positioning the detection sensors with respect to the pendulum, and shaft support members, integrally formed with the sensor storing members, for pivotally supporting two ends of the shaft of the pendulum and defining a swing space for the pendulum.

DESCRIPTION OF THE PREFERRED EMBODIMENTS

Figure 1:
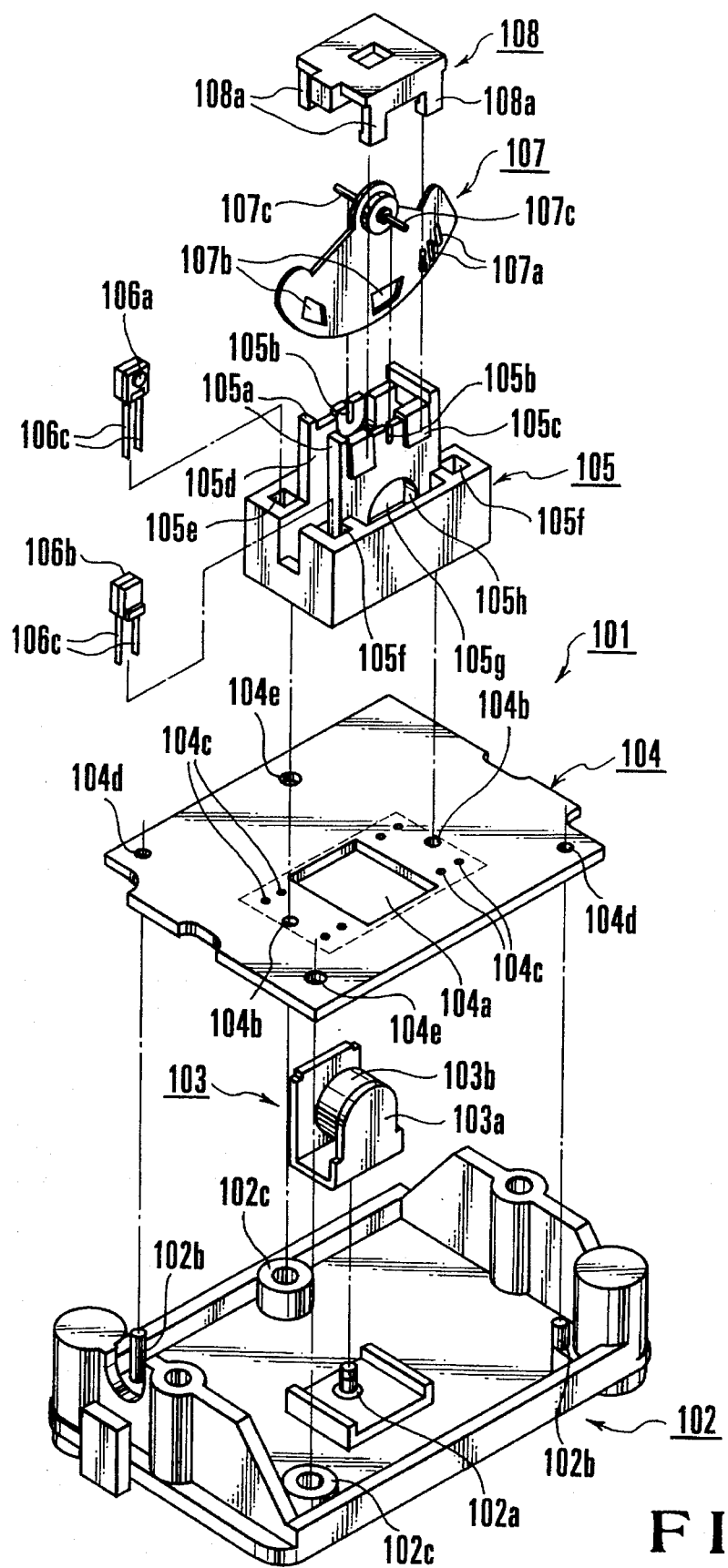
FIG. 1 is an exploded perspective view showing a pendulum acceleration sensor according to the first embodiment of the present invention.
Figure 2A:
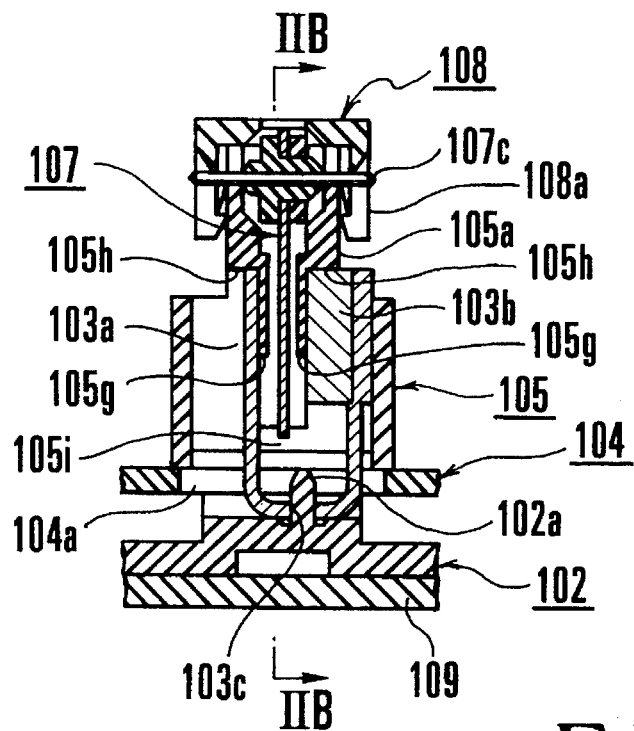
FIG. 2A is a longitudinal sectional view of the main part of the pendulum acceleration sensor in FIG. 1.
Figure 2B:
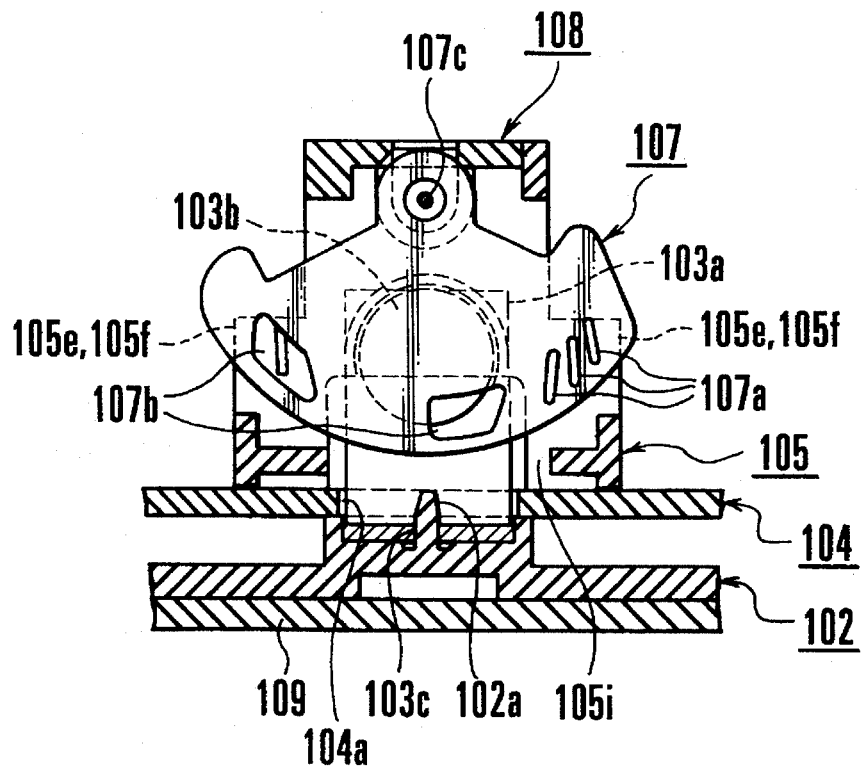
FIG. 2B is a sectional view taken along a line IIb—IIb of the acceleration sensor in FIG. 2A.

The first embodiment of the present invention will be described below with reference to the accompanying drawings. FIGS. 1 to 2B show a pendulum acceleration sensor according to the present invention. Referring to FIG. 1, the pendulum acceleration sensor denoted by reference numeral 101 as a whole is constituted by a support base 102, a magnetic damper 103, a printed board 104, a holder 105 for storing light-emitting and light-receiving elements as a displacement amount detection means, and a pendulum 107. The support base 102 has a substantially flat plate-like shape. A joggle 102a extends vertically upward from the central portion of the upper surface of the support base 102, and a pair of pins 102b and a pair of screw mount bosses 102c extend vertically upward from edge portions of the upper surface of the support base 102 at diagonal positions.

The magnetic damper 103 is constituted by a yoke 103a having a U-shaped vertical cross-section and a permanent magnet 103b mounted on one side surface portion of the yoke 103a. A hole 103c is formed in the bottom surface portion of the yoke 103a. A rectangular window 104a is formed in substantially the center of the printed board 104, and one pair of holes 104b and four pairs of holes 104c are formed in peripheral portions on opposite two sides of the window 104a. One pair of holes 104d and one pair of holes 104e are formed in edge portions of the printed board 104.

A pair of support walls 105a extend vertically upward from the holder 105 to oppose each other through a gap 105d constituting a swing space for the pendulum acceleration sensor 101. Each support wall 105a includes a shaft support portion 105b having a slit formed in the middle of its upper end, and wedge-like projections 105c respectively extending from two side portions of the support wall 105a. The support walls 105a are integrally formed with the holder 105 by using a resin material. Two pairs of storing/fitting recess portions 105e and 105f are formed in the four corners of the holder 105 which are located around the support walls 105a. These recess portions 105e and 105f oppose each other through the swing space. As shown in FIG. 2A, an extended portion 105g is formed on the lower end of each support wall 105a to extend downward. Thin recess portions 105h are formed outside the extended portions 105g. The permanent magnet 103b and the yoke 103a are fitted in the recess portions 105h. The extended portions 105g slightly protrude into the swing space in correspondence with the recess portions 105h. A fitting hole 105i in which the magnetic damper 103 is fitted is formed in the bottom portion of the holder 105. The fitting hole 105i communicates with the gap 105d constituting the swing space.

Reference numerals 106a and 106b denote two pairs of light-emitting and light-receiving elements (illustration of one pair is omitted). Each pair of light-emitting and light-receiving elements 106a and 106b are respectively stored in the corresponding storing/fitting recess portions 105e and 105f. The pendulum 107 is made of a nonmagnetic conductive material to have a substantially sectorial shape. A plurality of slits 107a and 107b are formed in the rim portion of the pendulum 107. A support shaft 107c is fixed to the center of the sectorial shape to be perpendicular to the plate surfaces. Reference numeral 108 denotes a rectangular cover serving as a stopper for preventing the support shaft 107c of the pendulum 107 from slipping off from the shaft support portion 105b. Four elastic engaging pieces 108a extend downward from the four corners of the bottom surface of the cover 108. Reference numeral 109 denotes a panel on which the pendulum acceleration sensor 101 is mounted.

A method of assembling the pendulum acceleration sensor 101 having the above arrangement will be described next. First, the joggle 102a of the support base 102 is fitted in the hole 103c of the yoke 103a to set the magnetic damper 103 upright on the support base 102. Then, the joggles (not shown) formed to extend downward from the lower surface of the holder 105 having the light-emitting and light-receiving elements 106a and 106b stored in the storing/fitting recess portions 105e and 105f are fitted in the holes 104b. In addition, leads 106c of the light-emitting and light-receiving elements 106a and 106b are inserted/soldered in/to the holes 104c of the printed board 104. Subsequently, the pins 102b are fitted in the holes 104d, and screws (not shown) are inserted in the holes 104e and screwed in the joggles 102c, thus mounting the printed board 104 on the support base 102. In this case, the magnetic damper 103 is fitted in the fitting hole 105i of the holder 105 mounted on the printed board 104 through the window 104a of the printed board 104. The yoke 103a and the permanent magnet 103b are fitted/held in the recess portions 105h of the support walls 105a. With this process, as shown in FIG. 2A, the yoke 103a and the permanent magnet 103b of the magnetic damper 103 oppose the swing space for the pendulum 107 through the recess portions 105h.

Subsequently, as shown in FIG. 2B, the support shaft 107c of the pendulum 107 is inserted in the slits of the shaft support portions 105b to support the pendulum 107 so as to allow it to swing about the shaft support portion 105b in the gap 105d. In this state, the yoke 103a and permanent magnet 103b of the magnetic damper 103 are located at the two side surfaces of the pendulum 107 to oppose each other. The light-emitting and light-receiving elements 106a and 106b also oppose each other through the slits 107a and holes 107b of the pendulum 107. Finally, the cover 108 is placed on the upper ends of the pair of support walls 105a to cover the gap 105d, and the elastic engaging pieces 108a are engaged/mounted with/on the projections 105c of the support walls 105a. With this structure, edge portions of the cover 108 serve as stoppers to prevent the support shaft 107c of the pendulum 107 from slipping off from the shaft support portions 105b. Note that after the holder 105 is mounted on the printed board 104, the light-emitting and light-receiving elements 106a and 106b may be inserted in the storing/fitting recess portions 105e and 105f, and the holder 105 may be soldered to the printed board 104.

In the pendulum acceleration sensor 101 having the above arrangement, since the support walls 105a having the shaft support portions 105b for the support shaft 107c are integrally formed on the holder 105, no assembly errors and manufacturing errors are caused between the shaft support portions 105b and the storing/fitting recess portions 105e and 105f. With this structure, the positional relationship between the slits 107a and holes 107b of the pendulum 107 and the light-emitting and light-receiving elements 106a and 106b stored in the holder 105 is always kept constant, thus improving the detection precision. In addition, the magnetic damper 103 mounted on the support base 102 can be fitted in the recess portions 105h formed in the extended portions 105g of the support walls 105a by fitting the magnetic damper 103 in the gap 105d through the fitting hole 105i formed in the bottom portion of the holder 105. Therefore, the yoke 103a and the permanent magnet 103b can be easily positioned in the swing space for the pendulum 107.

Since the extended portions 105g in which the recess portions 105h are formed are irrelevant to the strength of the holder 105, each extended portion 105g can be formed thin. For this reason, the yoke 103a and the permanent magnet 103b can be arranged near the pendulum 107. Therefore, a predetermined magnetic flux density Φ can be obtained by only one permanent magnet 103b, leading to a decrease in the number of components and a reduction in size. Furthermore, since the yoke 103a is fixed by fitting the joggle 102a of the support base 102 in its hole, assembly is facilitated, as compared with the prior art in which a pair of yokes are mounted through the plate surfaces of a pendulum.

Figure 3:
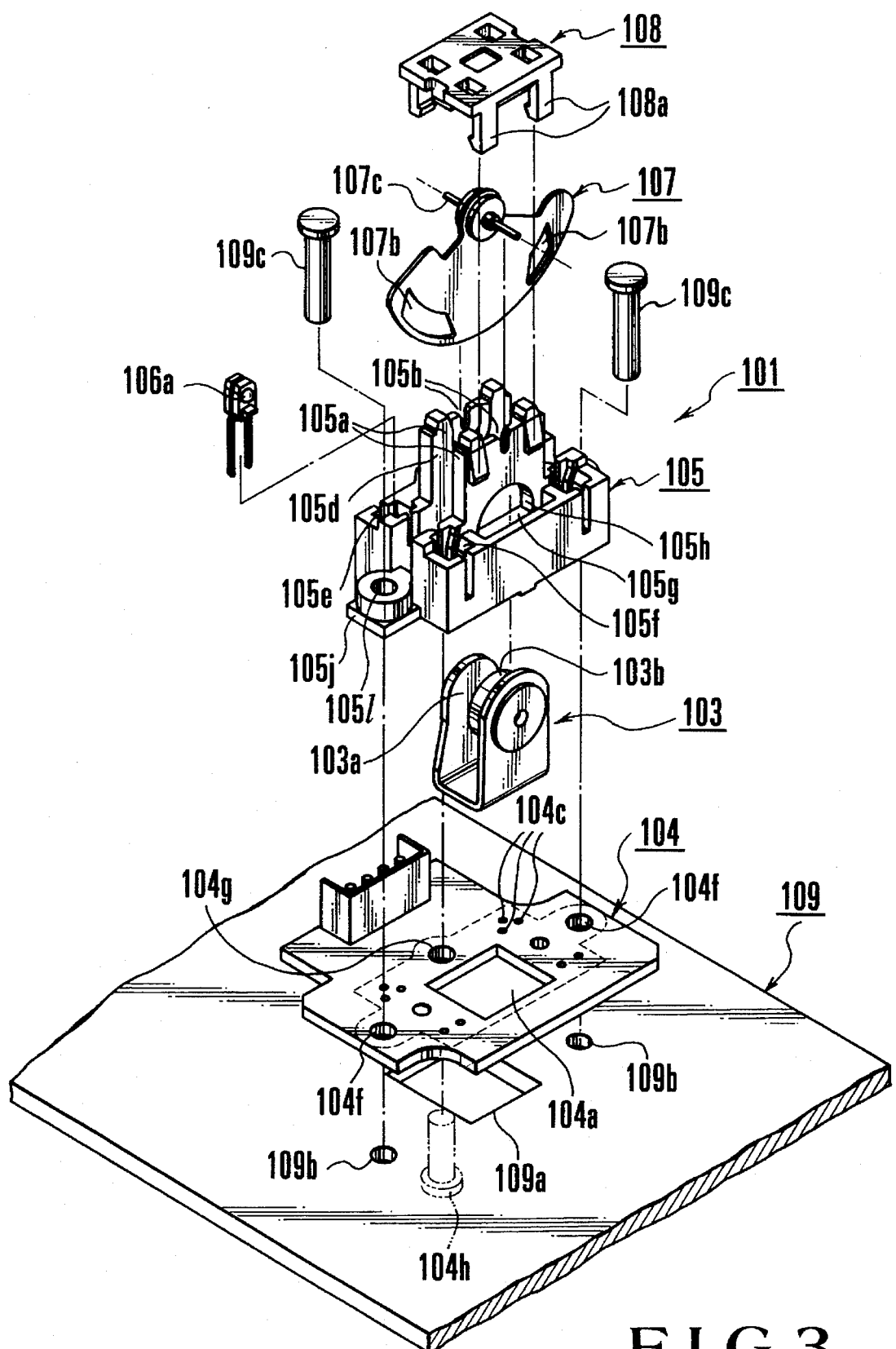
FIG. 3 is an exploded perspective view showing a pendulum acceleration sensor according to the second embodiment of the present invention.
Figure 4:
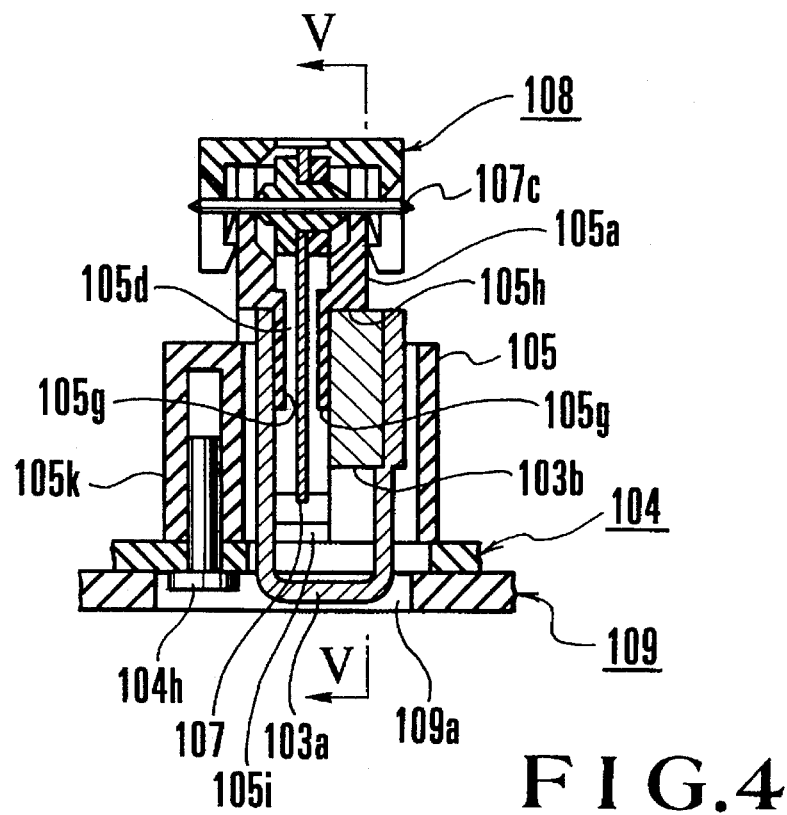
FIG. 4 is a longitudinal sectional view showing the main part of the acceleration sensor in FIG. 3.
Figure 5:
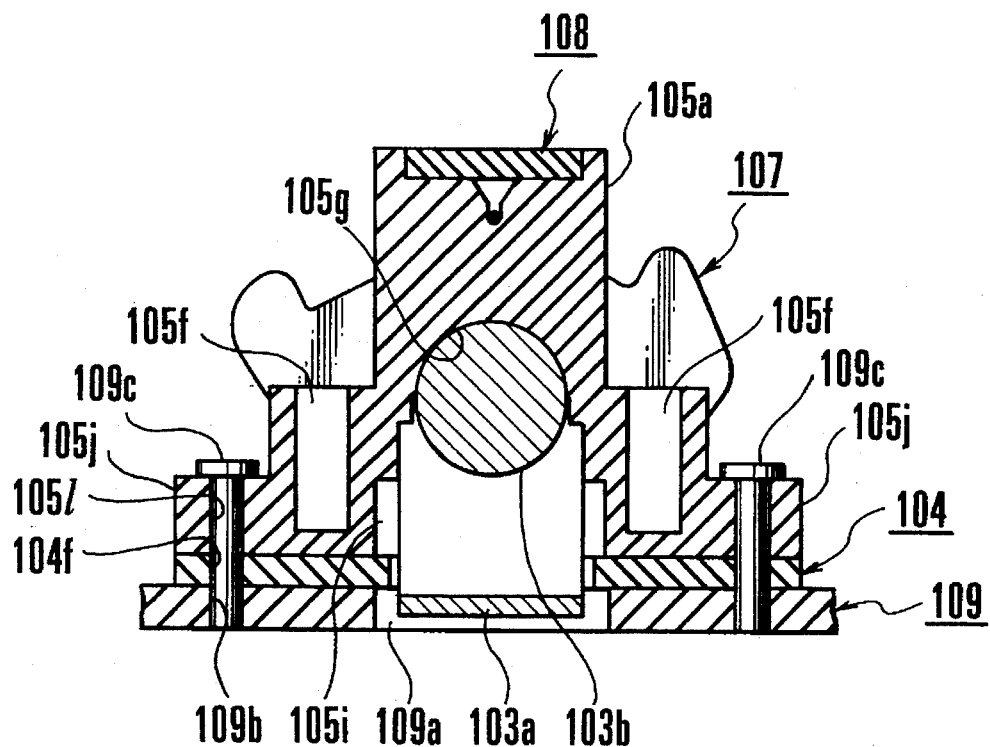
FIG. 5 is a sectional view taken along a line V—V of the acceleration sensor in FIG. 4.
Figure 6:
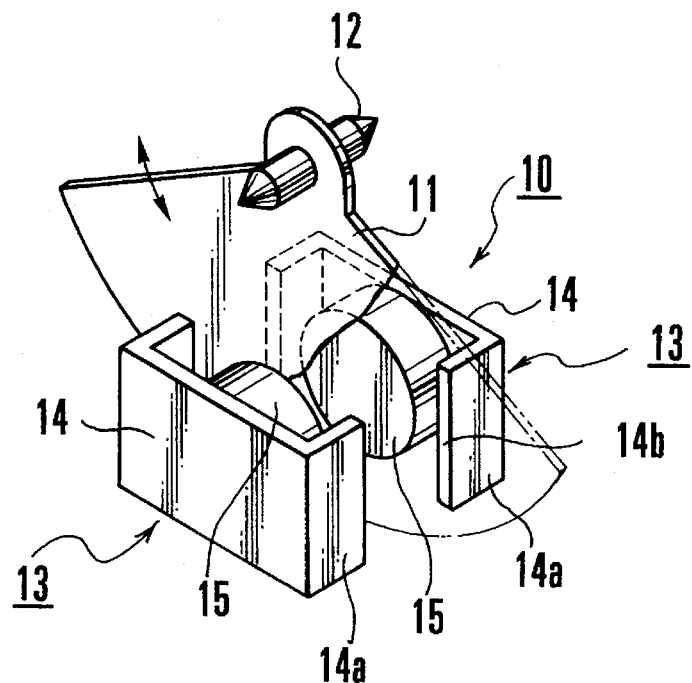
FIG. 6 is a perspective view showing the schematic arrangement of a conventional pendulum acceleration sensor.
Figure 7:
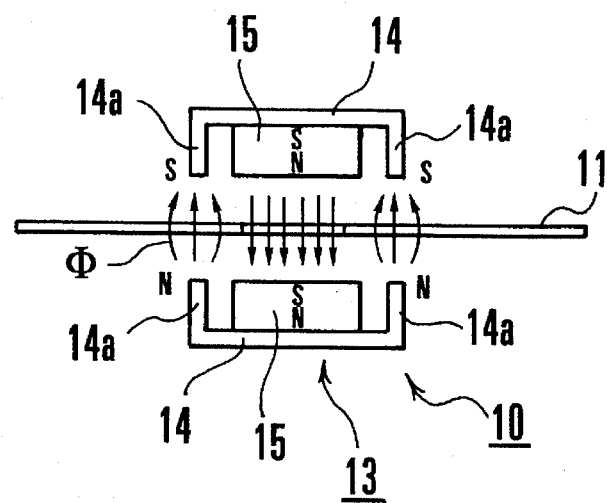
FIG. 7 is a plan view showing the schematic arrangement of the conventional pendulum acceleration sensor.
Figure 8A:
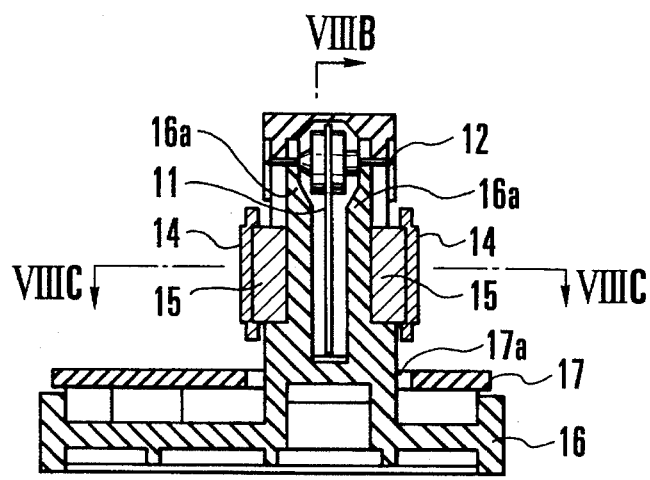
FIG. 8A is a longitudinal sectional view of the conventional pendulum acceleration sensor.
Figure 8B:
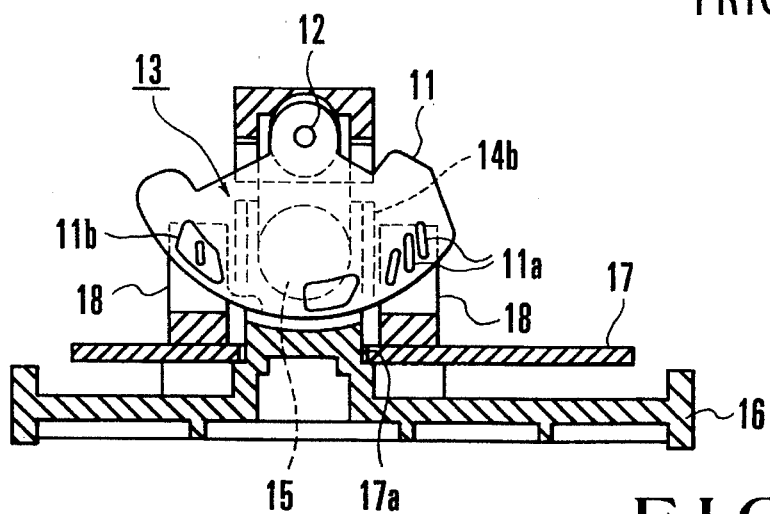
FIG. 8B is a sectional view taken along a line VIIIb—VIIIb of the acceleration sensor in FIG. 8A.
Figure 8C:
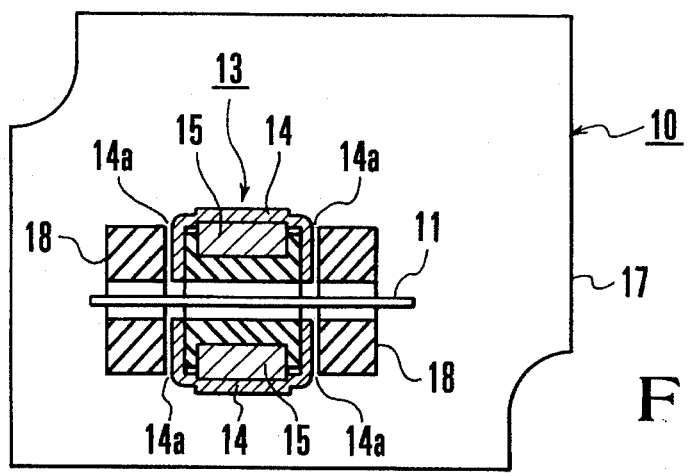
FIG. 8C is a sectional view taken along a line VIIIc—VIIIc of the acceleration sensor in FIG. 8A.

FIGS. 3 to 5 show the second embodiment of the present invention. In the second embodiment, a pendulum acceleration sensor 101 is directly mounted on the panel of an apparatus or the like without using the support base used to mount the sensor on a panel or the like in the first embodiment. Therefore, this embodiment includes a structure for positioning/fixing a magnetic damper 103 in a swing space, in place of the support base 102 for fixing the magnetic damper 103. More specifically, the distance between a yoke 103a and permanent magnet 103b of the magnetic damper 103 is set to be slightly smaller than the distance between the bottom surfaces of recess portions 105h formed in extended portions 105g of the holder 105. With this setting, as shown in FIG. 4, the magnetic damper 103 is positioned/fixed to the holder 105 such that the two recess portions 105h are clamped between the yoke 103a and the permanent magnet 103b by using the elastic deformation of the yoke 103a.

A pair of holes 104f are formed in peripheral portions on opposite two sides of a window 104a of a printed board 104, and a hole 104g is formed in a peripheral portion on one of the remaining two sides of the window 104a. A pair of mount portions 105j having holes 105l corresponding to the holes 104f protrude from two side portions of the holder 105, and a mount portion 105k having a blind hole corresponding to the hole 104g is formed upright on the rear surface portion of the holder 105. A window 109a slightly larger than the window 104a is formed in a panel 109 in correspondence with the window 104a of the printed board 104. In addition, a pair of holes 109b corresponding to the holes 104f are formed in peripheral portions on opposite two sides of the window 109a.

In this arrangement, the printed board 104 is mounted on the holder 105, on which the magnetic damper 103, light-emitting and light-receiving elements 106a and 106b, and a pendulum 107 are mounted, with pins 104h fitted/fixed in the hole 104g and the blind hole of the mount portion 105k. With this process, the pendulum acceleration sensor 101 is assembled as a unit as a whole. As shown in FIG. 5, the pendulum acceleration sensor 101 assembled as the unit in this manner is fixed/mounted on the panel 109 with pins 109c inserted in the holes 105l of the mount portions 105j, the holes 104f of the printed board 104, and the holes 109b of the panel 109. The yoke 103a and the pins 104h of the pendulum acceleration sensor 101 mounted on the panel 109 are located within the window 104a and the holes 109b of the panel 109.

In this embodiment, the window 109a is formed in the panel 109. If, however, a hole 109b is formed, as a boss hole, in the panel 109 or the printed board 104 is mounted on the panel 109 through a space to be separated therefrom by a predetermined distance, the window 109a of the panel 109 need not be formed.

According to this embodiment, since the support base 102 is not required, the number of components can be decreased to achieve a reduction in cost. In addition, a sensor can be formed as a compact unit. Furthermore, since the yoke 103a and the permanent magnet 103b are positioned/fixed in the recess portions 105h of the extended portions 105g, the distances between the permanent magnet 103b and the pendulum 107 and between the pendulum 107 and the yoke 103a can always be kept constant. Therefore, the density of a magnetic flux crossing the pendulum 107 is kept constant, and a stable damping effect can be obtained.

In the first and second embodiments, removal of the support shaft 107c from the shaft support portions 105b is prevented by the cover 108. If, however, the slits of the shaft support portions 105b in which the support shaft 107c is inserted are formed into undercut shapes to form constricted portions midway along the slits, the cover 108 is not required.

The pins 109c are used to mount the pendulum acceleration sensor 101 on the panel 109. However, the present invention is not limited to this. Various other fixing means can be used. For example, the sensor may be fixed to the panel with an adhesive.

As has been described above, according to the present invention, in the pendulum acceleration sensor, since the shaft support portions for swingably supporting the pendulum on the holder for storing the displacement amount detection means are integrally formed, manufacturing errors and assembly errors can be eliminated, and the positional relationship between the detection means and the pendulum can be kept constant, thereby improving the detection precision.

In addition, according to the present invention, the pendulum is made of a nonmagnetic conductive material, and the yoke and the permanent magnet for generating a magnetic flux in a direction perpendicular to the swinging direction of the pendulum are arranged. With this arrangement, the pendulum receives a braking effect and can quickly return to the initial position. Therefore, detection can be performed with good response characteristics.

Furthermore, according to the present invention, since the support base for supporting the holder and the holder are separated from each other, the yoke and the permanent magnet can be fitted/positioned in the spaces on the two sides of the pendulum, and the yoke and the permanent magnet can be arranged near the pendulum. For this reason, only one permanent magnet is required, and hence the number of components can be decreased. In addition, a compact structure can be realized.

Moreover, according to the present invention, the shaft support portions of the holder are extended downward to form the mount portions for the yoke and the permanent magnet, and the fitting holes, in which the yoke and the permanent magnet are fitted, are formed in the lower portions of the mount portions of the holder to eliminate the necessity of a support base. Therefore, a compact, inexpensive sensor can be realized. In addition, since the yoke and the permanent magnet are mounted in the extended portions, the distances between the permanent magnet and the pendulum and between the pendulum and the yoke are always kept constant, and the density of a magnetic flux crossing the pendulum can be kept constant, thus obtaining a stable damping effect.

What is claimed is:

1. A pendulum acceleration sensor comprising:

a plate-like pendulum which is comprised of nonmagnetic conductive material and swings about a shaft in a direction parallel to side surfaces of said pendulum in accordance with an acceleration;

at least a pair of detection sensors, arranged to oppose each other with said pendulum interposed therebetween, for detecting a displacement amount of said pendulum as it swings;

a holder unit made of a resin material and including sensor storing members for storing said detection sensors and positioning said detection sensors with respect to said pendulum, and shaft support members, integrally formed with said sensor storing members, for pivotally supporting two ends of the shaft of said pendulum and defining a swing space for said pendulum, said holder unit having a fitting hole formed in a bottom portion thereof to communicate with the swing space defined by the shaft support members, wherein said shaft support members and said sensor storing members are integrally formed with the holder unit, and wherein said shaft support members are comprised of a pair of shaft support portions for respectively supporting two ends of said pendulum, and a pair of support walls integrally having upper ends on which the shaft support portions are integrally formed, the support walls extending vertically upward from said sensor storing members to sandwich the swing space for said pendulum; and a magnetic damper, arranged in said holder unit to be near a side surface of said pendulum, for generating a magnetic flux in a direction perpendicular to a swinging direction of said pendulum and damping swing of said pendulum, wherein said magnetic damper is fitted and positioned in the swing space through the fitting hole of said holder unit, and further wherein said magnetic damper including a yoke having a U-shaped cross-section and a permanent magnet fixed to one inner surface of the yoke, the yoke being arranged to cause said pendulum to cross a space between the other inner surface of the yoke and the permanent magnet, and wherein said shaft support members have extended portions extended toward the fitting hole and having recess portions in which the yoke and permanent magnet of said magnetic damper are fitted, and said magnetic damper fitted through the fitting hole of said holder unit is positioned and fixed by fitting the yoke and the permanent magnet in the recess portions of the extended portions, and wherein said extended portions of said shaft support members are formed slightly protruding into the swing space of said pendulum, said recess portions are formed outside the extended portions, and said yoke and said permanent magnet of said magnetic damper are positioned and fixed in said recess portions so as to oppose each other with the extended portions interposed therebetween.

2. A sensor according to claim 1, further comprising a circuit board having said holder unit mounted thereon and a window formed therein in correspondence with the fitting hole of said holder unit, and a support base on which said circuit board and said magnetic damper are fixed, said magnetic damper fixed to said support base being fitted in the fitting hole of said holder unit through the window of said circuit board to be positioned and fixed.

3. A sensor according to claim 1, wherein said sensor storing members comprise four sensor storing portions for storing two pairs of said detection sensors, the sensor storing portions being located on two sides of the shaft support members and at four corner portions of said holder unit, and the sensor storing portions holding two pairs of sensors such that said sensors oppose each other with two said end portions of said pendulum interposed therebetween.

4. A sensor according to claim 1, wherein each of said shaft support members has a slit on the upper ends for pivotally supporting two ends of the shaft of said pendulum, and said sensor comprises the cover fitted on their upper ends so as to prevent the shaft of said pendulum in said slit from coming off.

5. A pendulum acceleration sensor comprising:

a pendulum which is comprised of a nonmagnetic conductive material and swings about a shaft in a direction parallel to side surfaces of said pendulum in accordance with an acceleration;

at least a pair of detection sensors, arranged to oppose each other with said pendulum interposed therebetween, for detecting a displacement amount of said pendulum as it swings;

a holder unit made of resin material and including sensor storing members for storing said detection sensors and positioning said detection sensors with respect to said pendulum, and shaft support members, integrally formed with said sensor storing members, for pivotally supporting two ends of the shaft of said pendulum and defining a swing space for said pendulum, said holder unit having a fitting hole formed in a bottom portion thereof to communicate with the swing space defined by the shaft support members, wherein said shaft support members and said sensor storing members are integrally formed with the holder unit, and wherein said shaft support members are comprised of a pair of shaft support portions for respectively supporting two ends of said pendulum, and a pair of support walls integrally having upper ends on which the shaft support portions are integrally formed, the support walls extending vertically upward from said sensor storing members to sandwich the swing space for said pendulum, and wherein said sensor storing members comprise four sensor storing portions for storing two pairs of said detection sensors, the sensor storing portions being located on two sides of the shaft support members and at four corner portions of said holder unit, and the sensor storing portions hold two pairs of sensors such that said sensors oppose each other with two said end portions of said pendulum interposed therebetween;

a circuit board having said holder unit mounted thereon and a window formed therein in correspondence with the fitting hole of the bottom portion of said holder unit; and a magnetic damper, arranged in said holder unit to be near a side surface of said pendulum, for generating a magnetic flux in a direction perpendicular to a swinging direction of said pendulum and damping swing of said pendulum, said magnetic damper including a yoke having a U-shaped cross-section and a permanent magnet fixed to one inner surface of the yoke, the yoke being arranged to cause said pendulum to cross a space between the other inner surface of the yoke and the permanent magnet, wherein said yoke and permanent magnet are fitted in the fitting hole of said holder unit through the window of said circuit board having said holder unit mounted thereon and are positioned to oppose each other in the swing space defined by the shaft support members, and wherein said shaft support members have extended portions extended toward the fitting hole and having recess portions in which the yoke and permanent magnet of said magnetic damper are fitted, and said magnetic damper fitted through the fitting hole of said holder unit is positioned and fixed by fitting the yoke and the permanent magnet in the recess portions of the extended portions, and wherein said extended portions of said shaft support members are formed slightly protruding into the swing space of said pendulum, said recess portions are formed outside the extended portions, and said yoke and said permanent magnet of said magnetic damper are positioned and fixed in said recess portions so as to oppose each other with the extended portions interposed therebetween; and a support base on which said circuit board and said magnetic damper are fixed, said magnetic damper fixed to said support base being fitted in the fitting hole of said holder unit through the window of said circuit board to be positioned and fixed.

* * * * *